Feb. 5, 1957 — L. J. BRANCATO — 2,780,265
THREAD COIL SECURED IN DUCTILE MATERIAL
BY DEFORMATION OF THE MATERIAL
Filed Feb. 28, 1955 — 2 Sheets-Sheet 1

INVENTOR.
LEO J. BRANCATO
BY Walter L. Bleiston
ATTORNEY

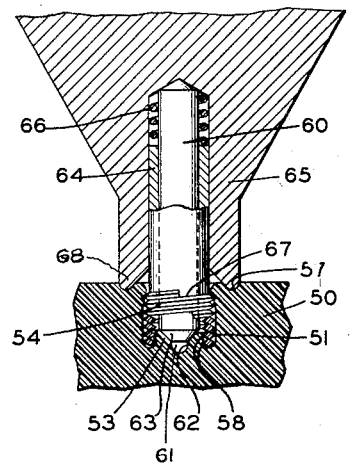
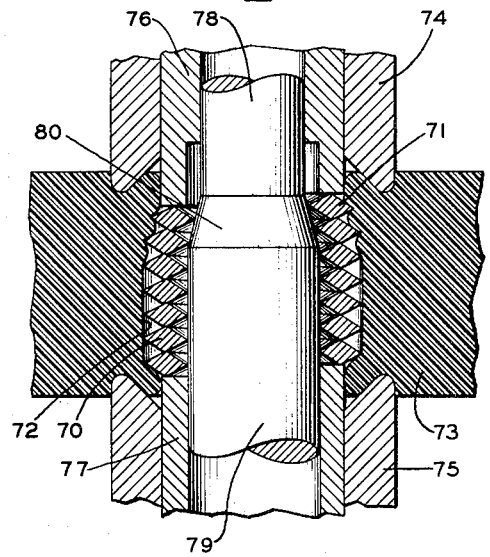
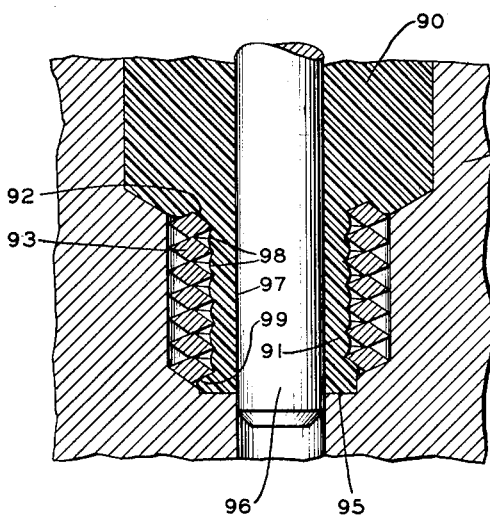
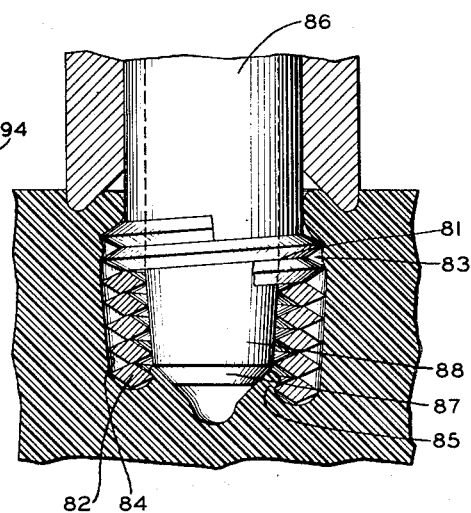

United States Patent Office 2,780,265
Patented Feb. 5, 1957

2,780,265

THREAD COIL SECURED IN DUCTILE MATERIAL BY DEFORMATION OF THE MATERIAL

Leo J. Brancato, Danbury, Conn., assignor to Heli-Coil Corporation, Danbury, Conn., a corporation of Delaware Application February 28, 1955, Serial No. 490,993

2 Claims. (Cl. 151—41.73)

The invention relates to screw threads in bodies of ductile materials of a ferrous or non-ferrous composition and especially of thermoplastics wherein the bodies are produced by die-moulding, or any other suitable process. The invention aims to provide such bodies with a hard metal thread in the form of a wire coil and to render it possible to apply and affix the coil to the body of ductile material as a final operation, that is, until after all other fabrication and/or plating operations have been performed, thereby, in many instances, improving the efficiency of the manufacturing procedure and decreasing the manufacturing expenses as compared with conventional procedures. The invention also aims to provide threads of the mentioned type as external threads or as internal threads in through-going or blind holes wherein the threads may be made self-locking if so desired.

Further objects and details of the invention will be apparent from the description given hereinafter and the accompanying drawing illustrating embodiments thereof by way of example.

In the drawing,

Fig. 5 is a diagrammatical cross-section of another tool applied to the coil in Fig. 4;

Fig. 6 is an illustration similar to Fig. 3 of a self-locking thread with a third tool as applied to the thread-forming coil;

Fig. 7 is an illustration of a self-locking coil in a blind hole, with a tool similar to that of Fig. 5 applied to the coil; and Fig. 8 is a cross-section of a wire coil forming an external thread on a hollow cylindrical extension of a body of a ductile material with a tool applied to the body extension for affixing the coil.

Figure 1:
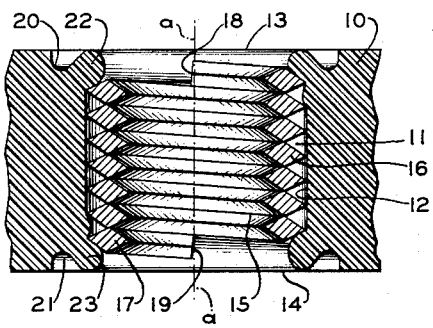
Fig. 1 is a longitudinal cross-section of a portion of a body of ductile material with a screw-thread wire coil lining a through-going hole.

Referring now to the drawing, Fig. 1 shows a portion 10 of a body of a ductile material. The portion 10 is provided with a hole 11 having throughout its major portion a cylindrical inner surface 12 which originally extended throughout the hole to the open ends 13 and 14 thereof with an unvarying diameter. A wire coil 15 of an outer diameter corresponding to the diameter of the surface 12 is inserted into the hole. The coil consists of a wire which has outer and inner screw-thread forming portions, denoted by 16 and 17, respectively. Thus, the wire may be of a diamond-shaped cross-section as shown or may have other cross-section suited to form screw threads.

The coil is somewhat shorter than the length of the hole 11. Its ends 18 and 19 are spaced from the open ends 13 and 14, respectively, of the hole and its ultimate end faces are preferably in planes parallel to the axis $a$—$a$ of the hole. In zones adjacent the open ends of the hole, the material 10 of the ductile body is compressed in the axial direction so that annular grooves 20 and 21 are created and that the displaced material has been caused to flow at 22 and 23 around the end convolutions and over the ultimate ends 18 and 19 of the coil. However, the displacement of material is such that the inner wire portions 17 are not affected and form an internal thread for a mating screw thread member. The material at 22 and 23 prevents an axial movement of the coil and the material bearing against the coil ends 18 and 19 prevents the coil from turning.

Figure 2:
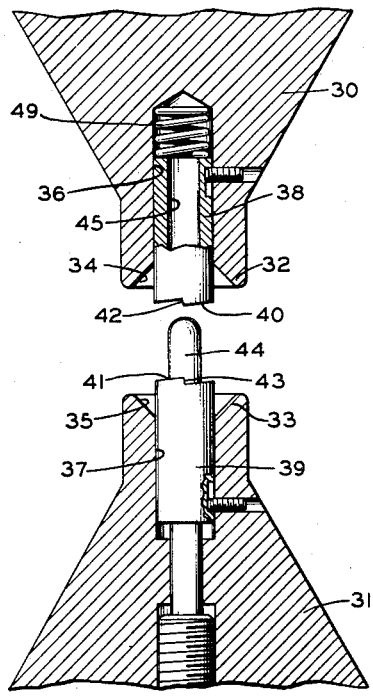
Fig. 2 is a diagrammatical longitudinal cross-section of a tool for securing the coil of Fig. 1 to the body of ductile material.
Figure 3:
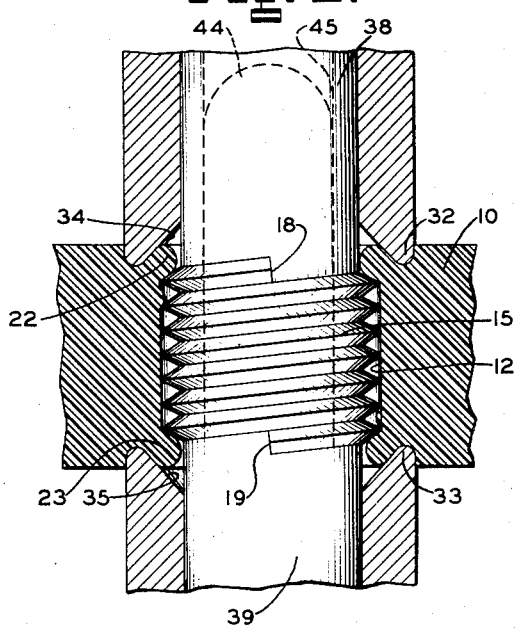
Fig. 3 is a diagrammatical side elevation partly in section of a portion of the tool of Fig. 2 as applied to the coil of Fig. 1.

In order to apply the coil as shown in Fig. 1 a tool according to Figs. 2 and 3 may be used. The tool comprises an upper stake 30 and a lower stake 31. Both stakes have annular end rims 32 and 33 with inner conical faces 34 and 35 corresponding to the aforementioned grooves 20 and 21. The stakes have axial bores 36 and 37 in which compressor members 38 and 39, respectively, are lengthwise movable limited distances. The member 38 bears against a spring 49 inserted between the member 38 and the bottom of the bore 36. This spring is heavy enough to compress the convolutions of the coil but, at the same time, it will collapse for variations in length of coils which are bound to occur in the manufacture. The compressor members have helical end faces 40 and 41 ending with helix shoulders 42 and 43, respectively. The faces 40 and 41 and shoulders 42 and 43 are so formed that they can engage the end faces and the ultimate ends of the inner portions of the wire cross-section. The compressor 39 has an axial extension 44 which can engage an axial bore 45 of the compressor 38 in order to ensure co-axiality of the parts and to prevent radial collapse of the coil during the staking operation. Fig. 3 shows clearly how the tool is applied to the coil 15 after its insertion in the hole 11 and how the compressors hold the convolutions of the coil 15 close together while the rims 32 and 33 cause material of the engaged zone to flow around the end convolutions as stated hereinbefore, when both members 30 and 31 are urged towards each other in the axial direction. By having one compressor fixed in axial position and the other spring loaded, it has been ensured that the force of compression applied to the members 30 and 31 is transmitted to the boss material rather than to the coil.

Figure 4:
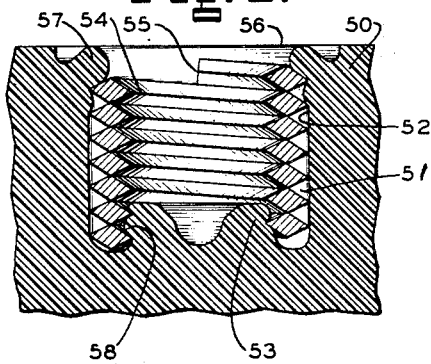
Fig. 4 is a cross-section of a thread-forming coil in a blind hole of a ductile body.

In the embodiment of Fig. 4, the ductile body 50 is provided with a blind hole 51 having an inner cylindrical surface 52 and a cylindrical raised bottom portion 53, the original diameter of which is so much smaller than the diameter of the surface 52 that a wire coil 54 which is similar to coil 15 in Fig. 1 can be inserted with its lower end between the surface 52 and the raised bottom portion 53. The so positioned coil 54 is shorter than the hole 51 so that the upper end face 55 of the coil is inside and spaced from the open end 56 of the hole. At that end of the hole the material is staked in a manner hereinbefore described with reference to the Figs. 1 to 3, so that material of the ductile body 50 is flown at 57 around the top convolution of the coil. At the lower end, material of the raised bottom portion 53 is urged outward after the insertion of the coil so that ductile material has been caused to flow at 58 around the inner portion of the lowest coil convolution. The securing of the coil can be accomplished with a tool shown in Fig. 5 applied to the coil 54. This tool comprises a lower stake 60 with a reduced end 61. This end can engage an indentation 62 preferably provided on the raised bottom portion 53. The stake has a conical portion 63 of a short length between the reduced end portion 61 and its main portion the diameter of which equals the inner diameter of the coil 54. When the stake is pressed downward the end 61 deepens the indentation 62 and the conical portion 63 urges the material of the bottom portion 53 around the end convolution of the coil at 58. A compressor sleeve 64 for the coil surrounds the lower stake 60 and is axially movable in the upper stake 65 against the restraint of a spring 66. The lower face 67 of the compressor is formed similar to the face 40 of the compressor 38 in Fig. 2, and the lower rim 68 of the upper stake 65 is similar to the rim 32. Thus, when the coil 54 is inserted in the hole 51 and the tool is applied as shown in Fig. 5 and urged downward, the ductile body material will be caused to flow around the end convolutions of the coil to hold the coil securely in position.

Figures 4A, 4B, 4C:
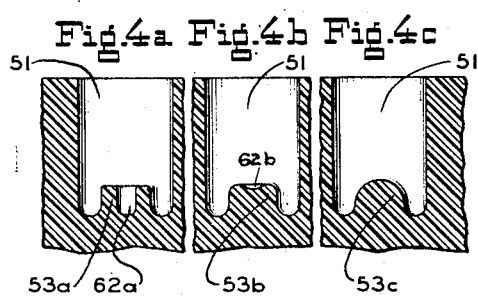
Figs. 4a, 4b and 4c show modifications of the blind hole.

The raised bottom portion may originally have any one of a variety of suitable forms of which some examples are shown in Figs. 4a, 4b, and 4c. In Fig. 4a, the raised bottom 53a of the hole 51 is approximately cylindrical with a rather deep indentation 62a. In Fig. 4b, the raised bottom 53b is somewhat tapered and has a shallow dent 62b; and in Fig. 4c, the raised bottom 53c is dome-shaped without an indentation. It will be understood that the stake end 61 of the tool will have to be so formed according to the shape of the raised bottom of the hole as to urge the raised bottom material to flow outward and around the inner portion of the lower coil end, as shown in Figs. 4 and 5.

If a locking action of the coil is desired, one end of the coil, approximately as much as one convolution may be reduced in its diameter. Fig. 6 shows a locking coil 70 with a reduced end convolution 71 secured in the through-going hole 72 of a plastic body 73. A bolt (not shown) intended to engage the coil 70 is to be screwed in from the end opposite the convolution 71. In order to assemble the coil in the hole, a tool is applied which comprises stakes 74 and 75 similar to the stakes 30 and 31 of Fig. 2. In this case the coil compressors 76 and 77 are tubular so as to press from opposite sides on the end convolutions of the coil. According to the reduced diameter of the end convolution 71, the tubular compressor 76 is of a somewhat smaller diameter than the compressor 77. Interiorly of the compressors, a guide 78 is provided which has a major diameter portion 79 fitting the interior of the main coil body and a tapered portion 80 according to the reduced diameter of the coil convolution 71. In other respects the tool is similar to those hereinbefore described as to basical design and effect.

In the embodiment of Fig. 7 a coil 81 with reduced end 82 is inserted in a blind hole. In this embodiment the cylindrical hole 83 is slightly tapered at 84 opposite the raised bottom portion 85. The lower stake 86 has a conical portion 87 corresponding to and for the same purpose as the portion 63 in Fig. 5, and adjacent that portion another slightly tapering portion 88 so that the coiled portion 82 during the axial compression as hereinbefore described in connection with the other embodiments, is properly held between the wall of the hole and the outer surface of the tapering portion 88. No further explanation of the manner in which the coil is secured in the hole appears to be necessary in view of what has been stated hereinbefore.

In a similar manner as holes in bodies of ductile material are provided with screw thread wire coils according to the foregoing description, cylindrical portions of a body of ductile material may be provided with external threads. An example of such structure is shown in Fig. 8. In this figure, the body 90 has a cylindrical extension 91 which projects from a shoulder 92. Preferably this shoulder is helically shaped so that the end of a wire coil 93 can bear with its one end against this shoulder. The extension 91 has originally a straight cylindrical outer surface on which the coil 93 is placed which is slightly shorter than the extension 91.

The coil 93 may be secured to the cylindrical extension 91, for instance, in the following manner. A retaining die 94 may be so formed and applied that it encloses at least a portion of the body 90, the wire coil 93 and the end face 95 of the extension 91. By urging a mandrel or punch 96 through an originally smaller diameter bore 97 which is co-axial with the extension 91, ductile material will be forced between the convolution as for instance at 98 and simultaneously in front of or around the end convolution adjacent the free end 95 of the extension 93, as clearly visible at 99.

Of course, it is also possible according to the present invention, to produce a hollow cylindrical or tubular article with an outer metal coil screw thread by extruding the ductile material which is intended to form the hollow cylinder or tube into or through the interior of the coil, whereby ductile material will enter between the inner portions of the coil convolutions and will cover at least portions of the coil ends in a manner similar to the form shown in Fig. 8.

It goes without saying that the tools shown in Figs. 3, 5, 6, 7, and 8 will be removed once the coils will have been secured in position by the flowing of the ductile material around the end convolutions.

Many alterations and modifications of the structure shown and described will be apparent to those skilled in the art without departure from the essence and spirit of the invention which for that reason shall not be limited but by the scope of the appended claims.

I claim:

1. An article of manufacture comprising a body of ductile material including a portion having a blind hole with an originally smooth cylindrical inner surface and a central raised bottom portion of a diameter smaller than said hole, and a cylindrical coil of a wire having inner and outer screw thread forming portions, said coil having an outer diameter fitting the diameter of said hole and being inserted in the latter so as to bear with one of its ends on the bottom of said hole between said raised portion and said inner surface, the other end of said coil being inside said hole spaced from the open end thereof, the material in a zone adjacent the open end of said cylindrical surface and the material of said raised bottom portion being compressed, a portion of the raised bottom portion being flown by said compression between the inner thread forming portions of at least the first and second lowermost convolutions of said coil, and a portion of the material adjacent the open end of the hole being flown on the top of and between the outer portions of at least the first and the second topmost convolutions of said coil.

2. An article of manufacture as claimed in claim 1, said cylindrical surface having a tapering end portion adjacent said bottom and said coil having a correspondingly tapering end.

References Cited in the file of this patent

UNITED STATES PATENTS

| | | |
|---|---|---|
| 820,586 | Marshall | May 15, 1906 |
| 1,928,443 | Archer | Sept. 26, 1933 |
| 2,262,450 | Caminez | Nov. 11, 1941 |
| 2,354,810 | Haas et al. | July 27, 1943 |
| 2,402,159 | Hattan | June 18, 1946 |
| 2,497,081 | Hattan | Feb. 14, 1950 |